United States Patent

Law

[15] 3,682,935
[45] Aug. 8, 1972

[54] COMPLEX NITROGEN-CONTAINING AROMATIC BORATES AS STABILIZERS FOR ORGANIC COMPOSITIONS

[72] Inventor: Derek A. Law, Pitman, N.J.
[73] Assignee: Mobil Oil Corporation
[22] Filed: Nov. 25, 1968
[21] Appl. No.: 798,527

Related U.S. Application Data

[62] Division of Ser. No. 602,504, Dec. 19, 1966, Pat. No. 3,442,807.

[52] U.S. Cl......260/296 B, 260/289 OX, 260/289 B, 260/296 R, 260/462 R, 260/566 R, 260/583 R, 260/583 P
[51] Int. Cl..............................................C07d 31/40
[58] Field of Search..260/462 R, 283, DIG. 1, 296 B, 260/289 B

[56] References Cited

UNITED STATES PATENTS

| | | | |
|---|---|---|---|
| 3,103,532 | 9/1963 | Dykstra | 260/462 |
| 3,256,310 | 6/1966 | Weil | 260/462 |
| 3,361,672 | 1/1968 | Andress et al. | 260/462 X |
| 3,410,856 | 11/1968 | Harris | 260/297 X |
| 3,442,807 | 5/1969 | Law | 260/462 X |
| 3,445,498 | 5/1969 | Cyba | 260/462 |
| 3,446,808 | 5/1909 | Cyba | 260/289 X |

*Primary Examiner*—Donald G. Daus
*Attorney*—Oswald G. Hayes, Donald L. Dickerson, Raymond W. Barclay and Stanley A. Strober

[57] ABSTRACT

Boron and nitrogen compounds are provided that are useful as antioxidants for organic fluids. They are made by reacting salicylaldimines with a product of reaction between a catechol and a boric acid.

10 Claims, No Drawings

COMPLEX NITROGEN-CONTAINING AROMATIC BORATES AS STABILIZERS FOR ORGANIC COMPOSITIONS

This application is a division of my copending application Ser. No. 602,504 filed Dec. 19, 1966 now U.S. Pat. No. 3,442,807.

This invention has to do with novel organic compositions and, in particular, this invention relates to additives for organic compositions which improve the high temperature stability thereof.

It is known that many industrial organic substances such as lubricants, fuels, heat exchange fluids, automatic transmission fluids, polymers, such as rubbers and plastics and the like, may break down chemically during use. Two major causes of this chemical breakdown are high temperature exposure and oxidation which can lead to the formation of acidic residues, change in physical properties, carbonaceous deposits and, in the case of fluids, increased viscosity and undue wear of the machinery with which these organic materials are operated. One of the preferred ways of reducing chemical breakdown by oxidation is by adding to an organic composition an agent known as an antioxidant. Antioxidants which are effective at high temperatures are of particular value.

It is the object of this invention to provide novel compounds which are useful as antioxidants. Another object is to provide organic compositions having improved oxidation stability. A further object is to provide lubricating compositions having high temperature oxidation stability. Another object is to provide a method of producing novel compounds useful as antioxidants for organic media. These and other objects will become apparent from the following disclosure.

It has now been discovered that novel multi-heterocyclic aromatic oxygen-boron-nitrogen compounds may be prepared and utilized in organic compositions for high temperature oxidation protection. These novel heterocyclic compounds are prepared by the reaction between an organic borate or pyroborate and nitrogen-containing compounds having a hydroxy group and a —C=N— group. It is believed that the boron atom forms a bond with the oxygen atom of the hydroxy group and the nitrogen atom to produce a heterocyclic product.

The preferred borates or pyroborates of this invention are aromatic compounds many of which have been described in U.S. Pat. application, Ser. No. 504,146 filed Oct. 23, 1965. The aromatic borates useful in this invention have the following general structure:

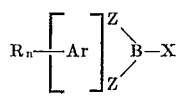

wherein Ar may be o-phenylene, o-naphthalene, 2,2'-diphenylene, 2,2'-dinaphthalene, or 5,6-benzo-2,2'-diphenylene; Z may be oxygen or sulfur, and most preferably oxygen; X may be hydroxy or hydrocarbyloxy, including alkoxy, aryloxy, alkaryloxy and aralkoxy containing from one to about 40 aliphatic carbon atoms, or may contain sulfur instead of oxygen, or

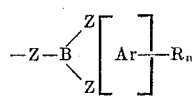

obtained by dehydrating the aromatic borate; R may be alkyl, alkenyl, aryl, aralkyl, alkaryl, cycloalkyl and oxy- and halo-substituted groups, wherein R may have from one to about 40 carbon atoms; and $n$ is from 0 to any number of available substituent positions for R on the nucleus. When $n$ is 0 the nucleus contains the normal number of hydrogen atoms. Catechol borate is preferred.

As indicated heretofore, the nitrogen-containing reactant is characterized by the presence of a hydroxy group and a —C = N— group wherein the boron atom becomes bonded both to the oxygen and nitrogen atoms to form what is believed to be an N—B—O heterocyclic ring.

One of the preferred nitrogen-containing reactant is an aromatic compound of a salicylaldimine or ketimine class having the structure:

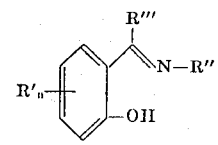

wherein R' and $n$ have the same identity as R and $n$ described above; R'' may be hydrogen, alkyl, alkenyl, aryl, alkaryl, aralkyl, cycloalkyl and these substituents may contain non-hydrocarbyl groups, such as hydroxyalkyl, hydroxyaryl, aminoalkyl, pyridinyl or picolinyl and the like containing from one to about 40 carbon atoms, and preferably one to 20; and R''' may be hydrogen, alkyl, aryl, alkaryl, or aralkyl, having from one to about 40 carbon atoms and preferably one to 20. Compounds of this class may be prepared by the reaction between salicylaldehydes or o-hydroxy ketones and primary amines.

The primary amines which may be used to produce the salicylaldimines of this invention include monoamines having alkyl and aromatic radicals, such as aniline, cyclohexylamine, methylamine, ethylamine, butylamine, hexylamine, octylamine, decylamine and the like. In addition, the amines may also include polyamines of the structure

$$H_2N—(R_aNH)_m—H$$

wherein $R_a$ is an alkylene having one to four carbon atoms or arylene and $m$ is an integer of 0 to about 10. Such polyamines as dipropylenetriamine, tetraethylenepentamine, pentaethylenehexamine, hexaethyleneheptamine, and the like are included herein. When $m$ is 0, the reactant to form the salicylaldimine is ammonia.

A second class of reactants is the hydroxyquinoline having the structure

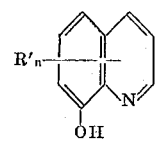

wherein R' and $n$ have the above definitions. The R'' of the previous salicylaldimine is part of the quinoline group here. These compounds are prepared by known methods.

The products of this invention are prepared by reacting the aromatic borate or pyroborate with the hydroxy-nitrogen compound. However, instead of the salicylaldimine, the salicylaldehyde or o-hydroxyaromatic ketone admixed with the primary amine may be employed, if desired, and the reaction can proceed as an in situ reaction.

Thus, the ring structures of this invention contain, aside from the heterocyclic borate group, a five- to six-membered —N—B—O—containing cyclic group. For example, the final structure of the product formed using a salicylaldimine or ketimine may be:

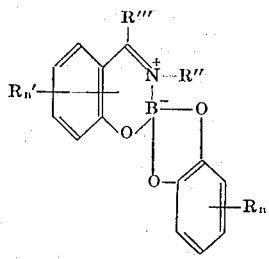

The final structure prepared using the hydroxyquinoline is believed to be as follows:

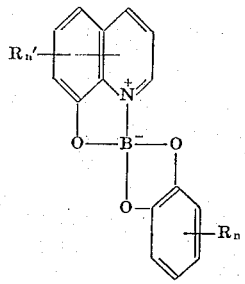

The R and R' groups attached to each of the aromatic rings may be the same or different as desired. The preferred catechol borate is merely used to illustrate the nature of the above structures.

These products are useful in a great variety of organic substances. Organic fluids in which the compounds of this invention may be used include mineral lubricating oils and synthetic lubricating oils. In the latter group are the polyolefin fluids; dicarboxylic esters, such as di-2-ethylhexyl sebacate; esters of trihydric alcohols and monocarboxylic acids, such as trimethylolpropane trioctanoate, and pentaerythritol esters of monocarboxylic acids, such as pentaerythritol tetracaprylate, wherein the monocarboxylic acids have from one to 30 carbon atoms; polyacetals, silicone polymeric fluids, polyphenyl ethers, polyglycol ethers, glycol esters and the like. These additives may also be added to greases using many of the above organic fluids as the organic medium with a suitable thickening agent. The additives may be used in elastomeric materials, such as natural rubber, chlorinated rubbers, elastomers produced from polyolefins and chlorinated derivatives. Other polymeric materials which may benefit from the additives of this invention include other plastics normally subjected to oxidation deterioration including polyolefins, such as polypropylene and polyethylene, vinyl-acrylic polymers and the like. The preferred organic medium is a lubricating oil or a grease medium of petroleum base or ester base fluids.

The additives of this invention may be included in the organic compositions in concentrations ranging from about 0.005 to about 15 percent by weight of total composition.

The following examples are presented to illustrate the invention more clearly although the scope of the invention is not to be limited thereby. Any reference to parts or percents are deemed to be on a weight basis.

EXAMPLE 1

In a suitable reactor equipped with a stirrer, thermometer and reflux condenser, were added 22 grams (0.2 mole) of catechol, 12.4 grams (0.2 mole) of boric acid in 250 ml. of benzene. The reaction mixture was heated to reflux and water (8.6 grams or 0.48 moles) was removed as an azeotropic mixture with benzene and collected in a condensate trap.

EXAMPLE 2

Into a suitable reactor was added a solution of 38.2 grams (0.2 mole) of N-phenylsalicylaldimine prepared by reacting salicylaldehyde with aniline dissolved in a benzene solution. This solution (27°C.) was added to a benzene solution containing the product of example 1 (35°C.). The temperature rose to 47°C. and a yellow product started to separate. The reaction mass was refluxed for 150 minutes and water (2.2 grams-0.12 moles) collected in a Dean-Stark trap. The product was filtered off in essentially pure form (58.5 grams; 94.8 percent yield); m.p. 234°–235°C.

Anal: Calculated: %N, 4.44; %B, 3.12;
Found: %N, 4.38; %B, 3.40

A similar product was prepared from salicylaldehyde, aniline and the product of example 1, using equivalent amounts of each.

EXAMPLES 3–10

The product of example 1 was reacted with a number of salicylaldimines of the structure

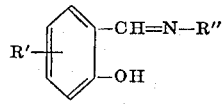

The product analyses of these examples are tabulated below in table I.

TABLE I

| Examples | | Percent yield | Product analysis | | | | | | M.P., °C. |
|---|---|---|---|---|---|---|---|---|---|
| | | | N | | B | | Mol. wt. | | |
| | | | Found | Calc. | Found | Calc. | Found | Calc. | |
| 3 | R'=H, R''=cyclohexyl | 88 | 3.80 | 4.44 | 2.87 | 3.40 | 320 | 340 | |
| 4 | R=H, R''=(pyridyl-CH₃) | 74 | 8.20 | 8.50 | 3.22 | 3.33 | | | 170 |
| 5 | R=H, R''=n-C₄H₉ | 94 | 3.68 | 4.61 | | | | | 102–103 |
| 6 | R=H, R''=n-C₈H₁₇ | 88 | 3.86 | 3.99 | 2.58 | 3.08 | 365 | 351 | |

TABLE I—Continued

| Examples | | Percent yield | Product analysis | | | | | | M.P., °C. |
|---|---|---|---|---|---|---|---|---|---|
| | | | N | | B | | Mol. wt. | | |
| | | | Found | Calc. | Found | Calc. | Found | Calc. | |
| 7 | R=H, R″=n—C$_{14}$H$_{29}$ | 100 | 3.17 | 3.31 | 2.06 | 2.55 | 423 | 423 | |
| 8 | R=H, R″=n—C$_{16}$H$_{33}$ | 98 | 2.89 | 3.10 | 2.15 | 2.39 | 463 | 451 | |
| 9 | R=H, R″=  —C$_{12}$H$_{25}$ | 96 | 2.75 | 2.89 | 1.90 | 2.24 | 408 | 483 | |
| 10 | R=(C$_{12}$H$_{25}$)$_3$, R=phenyl | 80 | 1.70 | 1.73 | 1.00 | 1.34 | 555 | 807 | |

*Yield based on water liberated during reaction.

EXAMPLE 11

The product of example 1 was reacted with 8-hydroxy-quinoline by adding 29 grams (0.2 mole) of 8-hydroxyquinoline in 150 ml. of benzene to the said catechol-boric acid product. The reaction mixture was heated to reflux for a period of 120 minutes. The resulting product was filtered off and analyzed. A yield of 83 percent of the resulting product was obtained having a m.p. of 199°–202°C.
Anal: Calculated: %N, 5.33; %B, 4.11
Found: %N, 4.18; %B, 4.17

EXAMPLE 12

Following the procedures of example 1, a product was obtained by reacting tridodecyl catechol with boric acid. This product was then reacted with 8-hydroxyquinoline following the procedures of example 2. A yield of over 80 percent was obtained:
Anal: Calculated: %N, 1.90; %B, 1.47
Found: %N, 2.13; %B, 1.21

EXAMPLE 13

The same tridodecyl catechol-boric acid product of example 12 was reacted with a salicylaldimine produced from salicylaldehyde and tetraethylenepentamine. The reaction conditions were the same as those of example 2. The produce had the following analysis:
Found: %N, 3.93; %B, 1.04; Mol Wt. 1155

EVALUATION OF PRODUCT

The products of this invention were evaluated in a catalytic oxidation test. A sample of the base lubricant is placed in an oven at a desired temperature. Present in the sample are the following metals either known to catalyze organic oxidation or commonly used materials of construction.
a. 15.6 sq. in. of sand-blasted iron wire,
b. 0.78 sq. in. of polished copper wire,
c. 0.87 sq. in. of polished aluminum wire and
d. 0.167 sq. in. of polished lead surface.

Dry air is passed through the sample at a rate of about 10 liters per hour.

One group of additives (A) were tested in a solvent refined mineral oil. A second group (B) was tested in the presence of a pentaerythritol ester prepared from a mixture of monocarboxylic acids. The first group was tested at 325°F. after a 40-hour air treatment and the second group was tested at 425°F. after 24 hours air treatment. The samples are observed for increase in acidity (NN) and kinematic viscosity (KV) before and after treatment, the loss in weight of the lead specimen and the relative amount of visual sludge. The results are tabulated in tables A and B respectively.

TABLE A

| Additive | NN Condn- % crease | KV Increase % | Lead Loss, mg. Sludge |
|---|---|---|---|
| None | — 9.7 | 265 | 220.0 Medium |
| Ex. 6 | 1.0 5.9 | 24 | 10.6 Medium |
| | 0.5 15.7 | 108 | 37.6 Medium |
| Ex. 7 | 2.0 0.3 | 8 | 0.3 Light |
| | 1.0 0.4 | 29 | 0.4 Light |
| Ex. 8 | 2.0 0.9 | 7 | 1.0 Trace |
| | 1.0 0.7 | 8 | 0.5 Medium |
| | 0.5 0.5 | 9 | 0.9 Trace |
| Ex. 9 | 2.0 0 | 2 | 0.4 Trace |
| | 1.0 0.1 | 8 | 0.4 Trace |
| | 0.5 0.7 | 13 | 0.5 Trace |
| Ex. 10 | 2.0 0.5 | 21 | 11.2 Trace |
| | 1.0 0.47 | 16 | 12.7 Trace |
| | 0.5 12.9 | 168 | 146.0 Nil |
| Ex. 12 | 2.0 0.4 | 11 | 49.0 Trace |
| | 1.0 0.1 | 9 | 19.6 Trace |
| | 0.5 9.9 | 70 | 136.0 Trace |
| Ex. 13 | 2.0 0.5 | 9 | — Light |
| | 1.0 10.6 | 69 | — Light |
| | 0.5 18.0 | 160 | — Trace |

TABLE B

| Additive | NN Conc., In- % crease | KV Increase % | Lead Loss, mg. Sludge |
|---|---|---|---|
| None | — 5.9 | 390 | 17.6 Nil |
| Ex. 2 | 0.5 <0 | 4 | 0.3 Light |
| | 0.25 2.1 | 15 | 0.6 Nil |
| Ex. 6 | 2.0 0.8 | 10 | 0.0 Medium |
| | 1.0 1.4 | 8 | 0.0 Light |
| | 0.5 4.9 | 61 | 0.0 Nil |
| Ex. 7 | 2.0 2.1 | 23 | 1.2 Light |
| | 1.0 5.1 | 63 | 1.4 Nil |
| Ex. 8 | 2.0 0.9 | 11 | 1.6 Heavy |
| | 1.0 0.7 | 4 | 1.2 Nil |
| | 0.5 4.6 | 59 | 1.0 Nil |
| Ex. 9 | 2.0 0.1 | 11 | 0.2 Heavy |
| | 1.0 4.1 | 58 | 0.3 Nil |
| | 0.5 4.0 | 193 | 0.4 Nil |
| Ex. 10 | 3.0 <0 | 26 | 61.5 Heavy |
| | 1.0 3.3 | 46 | 23.7 Heavy |
| | 0.5 4.9 | 88 | 16.9 Nil |

The above results indicate that the additives of this invention are useful to prevent the chemical breakdown of organic fluids, as well as other organic media. After exposure to high temperatures and air for extended periods of time, uninhibited mineral oils are especially susceptible to oxidation. The addition of a small amount of the novel compounds of this invention reduce the chemical deterioration significantly. These compositions may contain other additives which provide a variety of additional characteristics such as detergents, extreme pressure agents, pour point depressants, additional stability agents, viscosity control agents and the like.

This invention has been described with respect to the specific examples, however the scope of the invention

I claim:
1. A compound of the formula

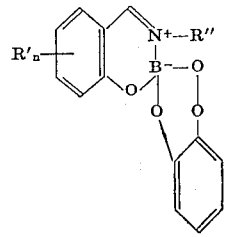

wherein R' is selected from the group consisting of hydrogen and a $C_{12}$ alkyl, R'' is selected from the group consisting of cyclohexyl, phenyl, dodecylphenyl, a $C_4$–$C_{16}$ alkyl and

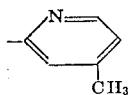

and $n$ is 1, 2 or 3.

2. The compound of claim 1 wherein R' is hydrogen, R'' is phenyl and $n$ is 1.
3. The compound of claim 1 wherein R' is hydrogen, R'' is cyclohexyl and $n$ is 1.
4. The compound of claim 1 wherein R' is hydrogen, R'' is

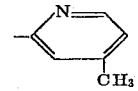

and $n$ is 1.
5. The compound of claim 1 wherein R' is hydrogen, R'' is n-butyl and $n$ is 1.
6. The compound of claim 1 wherein R' is hydrogen, R''is n-octyl and $n$ is 1.
7. The compound of claim 1 wherein R' is hydrogen, R'' is n-tetradecyl and $n$ is 1.
8. The compound of claim 1 wherein R' is hydrogen, R'' is n-hexadecyl and $n$ is 1.
9. The compound of claim 1 wherein R' is hydrogen, R'' is dodecylphenyl and $n$ is 1.
10. The compound of claim wherein R' is dodecyl, R'' is phenyl and $n$ is 3.

* * * * *